June 21, 1966

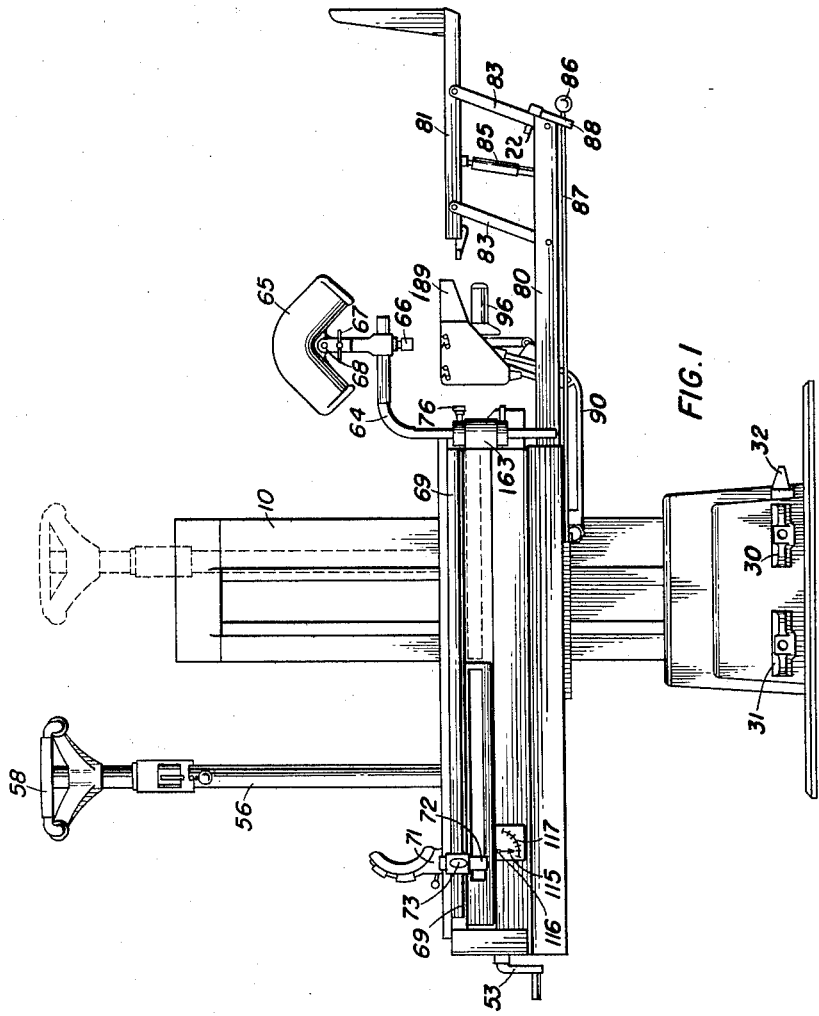

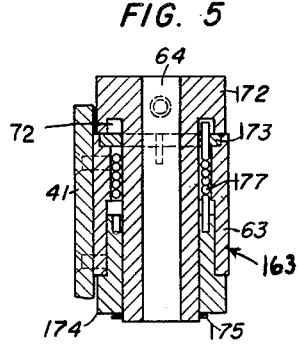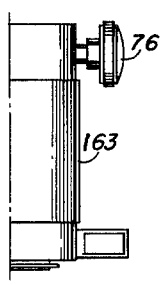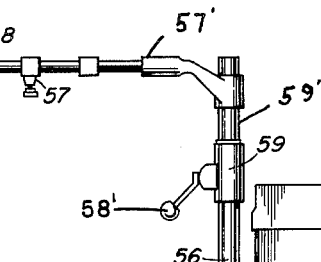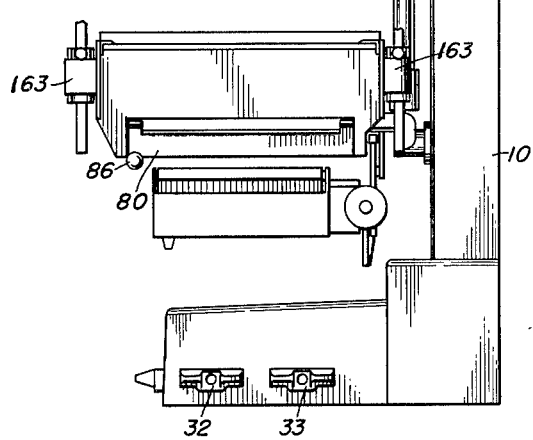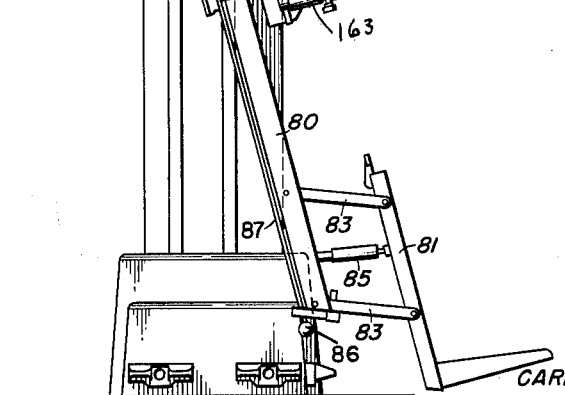

C. H. BOETCKER ET AL 3,257,556

TILTABLE SURGICAL TABLE SUITED FOR
RADIOGRAPH-UROLOGY PROCEDURES

Filed Oct. 3, 1963

INVENTORS
CARL H. BOETCKER, RAYMOND L. JEWELL,
ALVIN LODGE & CHARLES M. GILMORE
BY
Charles L Lowenheim
atty June 21, 1966 C. H. BOETCKER ET AL 3,257,556
TILTABLE SURGICAL TABLE SUITED FOR
RADIOGRAPH-UROLOGY PROCEDURES
Filed Oct. 3, 1963 8 Sheets-Sheet 4

INVENTORS
CARL H. BOETCKER, RAYMOND L. JEWELL
ALVIN LODGE & CHARLES M. GILMORE
BY

Charles L Lovercheck
atty

June 21, 1966  C. H. BOETCKER ET AL  3,257,556
TILTABLE SURGICAL TABLE SUITED FOR
RADIOGRAPH-UROLOGY PROCEDURES Filed Oct. 3, 1963  8 Sheets-Sheet 5

INVENTORS
CARL H. BOETCKER, RAYMOND L. JEWELL
ALVIN LODGE & CHARLES M. GILMORE
BY

Charles L. Lovercheck
atty

June 21, 1966  C. H. BOETCKER ET AL  3,257,556
TILTABLE SURGICAL TABLE SUITED FOR
RADIOGRAPH-UROLOGY PROCEDURES
Filed Oct. 3, 1963  8 Sheets-Sheet 7

INVENTORS
CARL H. BOETCKER, RAYMOND L. JEWELL,
ALVIN LODGE & CHARLES M. GILMORE
BY
Charles L Lovenchich
att

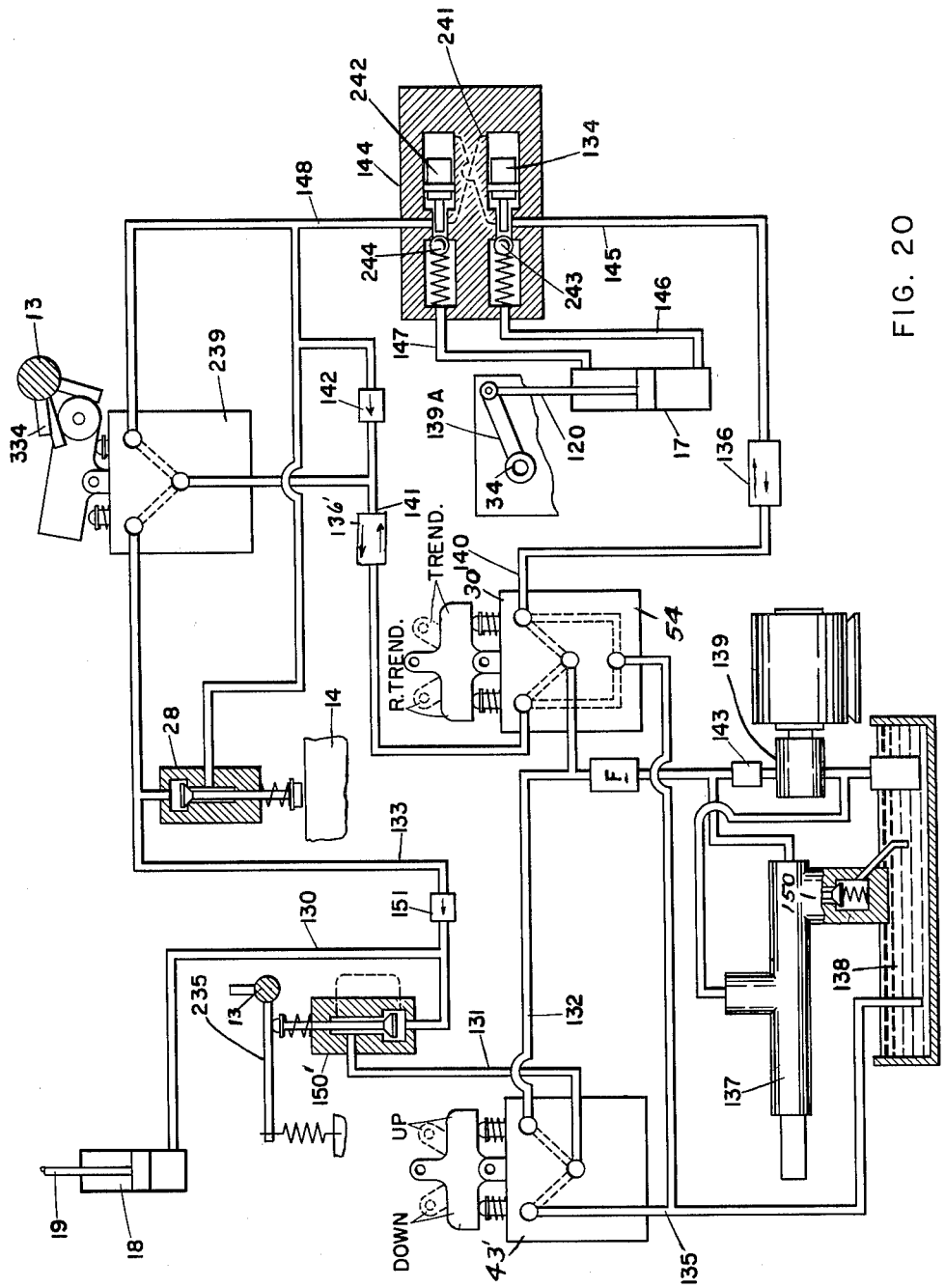

United States Patent Office 3,257,556
Patented June 21, 1966

3,257,556
TILTABLE SURGICAL TABLE SUITED FOR RADIOGRAPH-UROLOGY PROCEDURES
Carl H. Boetcker, Lake City, and Raymond L. Jewell, Alvin Lodge, and Charles M. Gilmore, Erie, Pa., assignors to American Sterilizer Company, Erie, Pa., a corporation of Pennsylvania
Filed Oct. 3, 1963, Ser. No. 313,564
14 Claims. (Cl. 250—55)

This invention relates to tables and, more particularly, to the type of medical table particularly suited for urology procedures.

For most of the past decade, procedures for urological examination and treatment have advanced more rapidly than improvements in table design and function. It became evident that this gap between professional skill and mechanical equipment could not be corrected by mere modification or adaptation of existing tables. The table disclosed herein and the subject matter of this application has a twofold objective:

(1) A table which will have the optimum functions for the most demanding procedures in urology and related radiography; and (2) A table which will perform those functions smoothly, dependably, and with maximum assistance to the urological team.

The table disclosed herein has a carriage which is adjustable from the perineal end of the table to the head end thereof and which combines the X-ray head and the bucky diaphragm in a single unit, thus eliminating the necessity for alignment of the two relative to each other. While this table is specifically for urology, this feature is included so that a small hospital can use it for X-ray of any other part of the anatomy.

The entire top of the table is electrically conducting and X-ray penetrable, thus greatly enlarging the area of exploration and permitting fluoroscopic examinations. The adjusting handle at the head end moves the cassette and X-ray tube in unison through any point in a thirteen inch range, for example. Thus, the tube is always centered on the film and adjustable to the patient. Any type of stationary grid or bucky diaphragm preferred by the radiologist may be used in the mobile carrier.

The tube stand assembly will accommodate standard types of X-ray heads. Securely mounted to the frame of the table and longitudinally adjustable over a distance of thirteen inches, the holder maintains the relationship between the cassette and the X-ray tube through all variations in table position. When not in use, the tube holder may be rotated toward the head end of the table and locked out of the way.

The fully radiographic top section and the elimination of the conventional center column mounting provide "access" for fluoroscopy, wherever indicated in urological procedures.

The table has a built in hydraulic automatic safety device which operates in the reverse Trendelenburg (standing) position so that there is never any interference between the foot end of the table and the floor. With the patient in the flat position, the operator requires only the actuation of the reverse Trendelenburg pedal to accomplish the upright standing position. During this movement, he may be sure that the foot end of the table will not strike the floor. The hydraulic circuitry is such that the table cannot be lowered when the table is beyond twenty-five degrees in the reverse Trendelenburg position.

Electro-hydraulic power adjusts the table to any selected point in a vertical height range of approximately twenty-four inches and in an arc from fifteen degrees Trendelenburg to seventy-five degrees reverse Trendelenburg. There is no lag or overrun of the control mechanism even with a three hundred pound patient. A safety device automatically raises the table at approximately twenty-five degrees reverse Trendelenburg, at which time seventy-five degrees reverse Trendelenburg can be attained. This prevents damage to the extended foot section. But for the safety device, the foot end of the table might strike the floor. The table cannot be lowered from the "upright" position until it is returned to approximately twenty-five degrees reverse Trendelenburg.

Dual controls are located at the operating end of the table and at the side of the table so that the surgeon has complete control of the table while operating and the X-ray technician has control for his procedures.

The wide range of vertical adjustment permits the urologist to stand or sit, according to his convenience and the nature of the procedure. Adjustment of the table is positive to the smallest fraction of an inch and travel in either direction is so smooth and gentle as to cause no alarm to the patient. The table has dual controls at the foot end and side of the table to permit height adjustment by the urologist or a member of the team.

Both height and Trendelenburg adjustments of the table may be made simultaneously or separately by the urologist from the foot end of the table or by an assistant from the side of the table. A detachable foot pedal provides hydraulic positioning of the table in the event of electrical power failure.

Toe-tip controls for up, down, Trendelenburg, and reverse Trendelenburg are strategically placed to permit the urologist, whether sitting or standing, to maintain close proximity to his patient while retaining full directional control of the table.

The knee crutch socket assemblies are built so that the surgeon can abduct the legs as required without breaking his sterile technique or touching anything with his hands. These sockets are free to move in the outward direction and cannot be turned inwardly without releasing a spring lock. This lock is not dependent upon a ratchet control and, therefore, is infinite in adjustment outwardly to a forty-five degree angle from the side of the table.

Contour knee rests provide unusual patient comfort and firm, positive support with no objectionable pressure. Length, height, and angle of the table are adjustable to provide the required abduction of the thighs in patients of all sizes. An improved clamping device on the table assures rapid and positive locking of the adjustable parts. The vertical support rod is curved to prevent pressure under the upper leg.

The tray is made up as a completely sterilizable transurethral tray assembly. Not only is the tray assembly sterilizable but the handle which controls the tray is sterilizable so that the surgeon has complete control without breaking sterile technique. The complete assembly of the tray can be brought up to a position level with the table top and it can be moved outwardly a distance of approximately six inches from the perineal end of the table. It can be lowered and rolled back under the table to any position desired by the surgeon.

The tray assembly is made up of three parts. The lower part is the tray carrier having a hose connection for drainage. The tray itself fits into the carrier and is hinged in such a way that the operating surgeon can swivel the tray upwardly in such a manner to catch the fluid flowing from the orifice, thus eliminating the spilling of this fluid on his gown and body as well as the floor. There are two slots in the carrier so that the pan can be extended approximately two inches away from the patient, thus making a longer pan.

A deep, two piece drain tray minimizes splashing and may be positioned at any point by means of the sterilizable handle. An angulated hose connection assures proper drainage regardless of table or tray position. The upper tray has two position settings. The tray assembly raises level with the table and has a removable rack for test tubes. A Monel screen traps tissue and prevents splashing. The complete tray assembly is sterilizable.

A two hole test tube holder is provided so that specimens can be taken. This is secured to a flexible soft aluminum strap and can be adjusted to whatever position is required by the surgeon.

The whole assembly can be furnished in two ways. In one, the base is actually bolted down to the floor. This provides a very neat and tight unit and does not allow any fluids to enter the base. The second has a plate base of its own and can be used where a hospital requires the table to be used in different areas. Casters are not provided on this unit because of the requirements for stability.

An extendible thigh support made of X-ray penetrable material is provided which can be adjusted to suit any size patient. Also, the leg extension can be adjusted in two inch increments to accommodate the small child as well as the tall adult.

This table also has the feature of being capable, through the movement of the bucky diaphragm unit, to be used for fluoroscopy of any part of the anatomy.

Easy patient transfer is facilitated by the clean table side and recessed base. Bedfast patients may be transferred to the table at stretcher height and quickly positioned as required. Ambulatory patients step easily onto the rubber covered footrest. The tube stand may be rotated ninety degrees to parallel the table side.

The telescopic foot section provides complete lower extremity support to the patient throughout the full positioning range. The foot section is adjustable in increments by means of a dual release-lock knob. A positive cam lock prevents the raised leg section assembly from accidentally falling under the patient's weight. An adjustable self-locking thigh shelf extends from the leg section at the perineal edge and may be positioned at any point.

One of the major design distinctions of this table is the cantilever suspension of the table on the base column which provides almost unlimited access above and below the table for radioscopic and fluoroscopic techniques in support of urology.

It is, accordingly, an object of the present invention to provide an improved urology table.

Another object of the invention is to provide an improved table having, in combination therewith, improved leg rests.

Still another object of the invention is to provide an improved drain tray and support mechanism therefor in combination with a surgical table.

It is another object of the invention to provide a table especially suitable for urological procedures which is simple in construction, economical to manufacture, and simple and efficient to use.

Still yet another object of the invention is to provide a table which has a leg rest, a drainage tray, and a control mechanism, all conveniently accessible from the perineal end of the table.

It is yet another object of the invention to provide an operating table having a bucky diaphragm and X-ray tube support in a single unit, thus eliminating the necessity for alignment thereof.

A further object of the invention is to provide an improved control mechanism for a table.

A still further object of the invention is to provide an X-ray table having parallel connected controls at the side and perineal end of the table.

It is a further object of the invention to provide a table having crutch sockets which can be adjusted by the surgeon without breaking his sterile technique.

Still a further object of the invention is to provide a transurethral tray assembly which is completely sterile and sterilizable, including the adjusting handle therefor, and which can be stowed under the table.

Yet a further object of the invention is to provide an improved tray assembly wherein the lower part of the tray carrier has a hose drainage and the tray itself fits into the carrier and is hinged in such a way that the operating surgeon can swivel the tray upwardly to catch the fluid flowing from the orifice, thus eliminating the spilling of this fluid on the surgeon's gown and body as well as on the floor.

It is yet a further object of the invention to provide a combination table, tray, and improved test tube holder therefor.

Still yet a further object of the invention is to provide a table having a top made of a conductive X-ray quality penetrable material.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a side view of a table according to the invention;

FIG. 2 is an end view of the table shown in FIG. 1;

FIG. 3 is a front view similar to FIG. 1 showing the table swung to a generally vertical position;

FIG. 4 is a partial side view of one of the leg holder fastening devices;

FIG. 5 is a longitudinal cross sectional view of the elements shown in FIG. 4;

FIG. 20 is a hydraulic diagram for the device.

Now with more particular reference to the drawings, a table is shown made up generally of a base with a fixed frame 10 and a table top swingably mounted on the frame with a plurality of accessories supported on the table top constituting improvements over tables shown in the prior art. The table top is provided with knee rests, footrests, a buttock support, a drain tray, X-ray equipment, and other suitable equipment.

The base has a horizontal portion and a vertical portion which form generally an L-shape. The vertical portion extends upwardly at one end of the horizontal portion. The table is supported in cantilever fashion on the vertical portion at one side of the vertical portion over the base.

Figure 7:
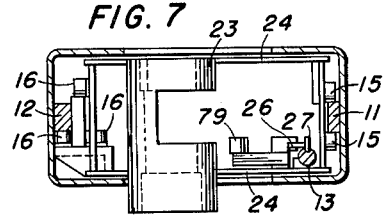
FIG. 7 is a cross sectional view taken on line 7—7 of FIG. 6.
Figure 10:
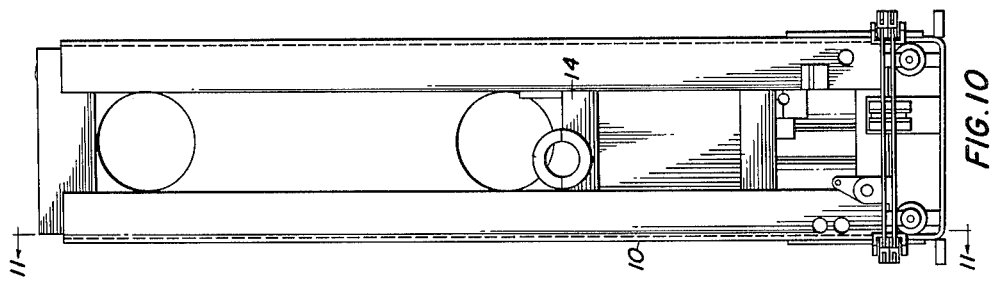
FIG. 10 is a front view of the frame with the table removed.
Figure 11:
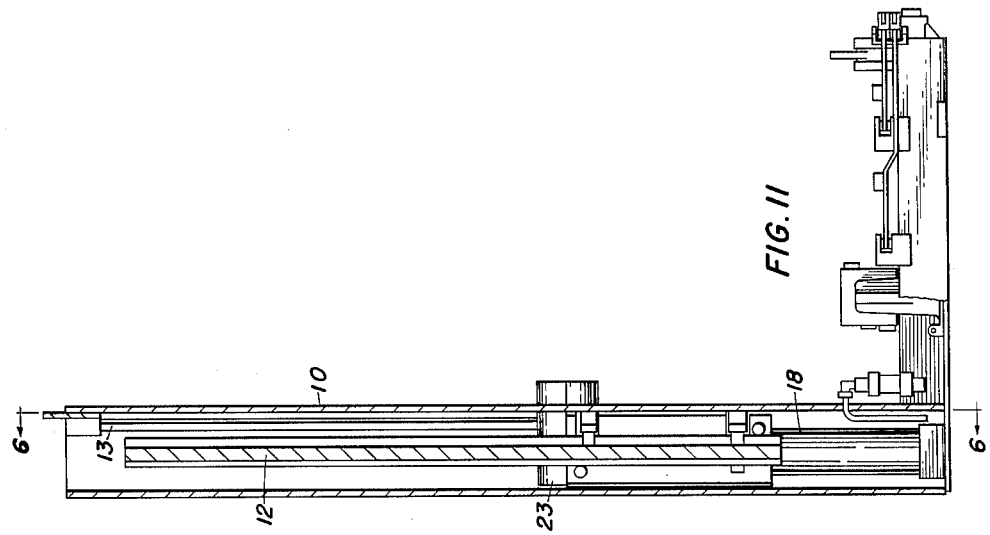
FIG. 11 is a cross sectional view taken on line 11—11 of FIG. 10.

The table is supported on the frame 10 by means of a carriage 14 to which is fixed a journal 23 (FIG. 7).

*Carriage*

Figure 9:
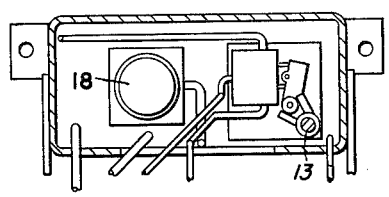
FIG. 9 is a view taken on line 9—9 of FIG. 6.
Figure 8:
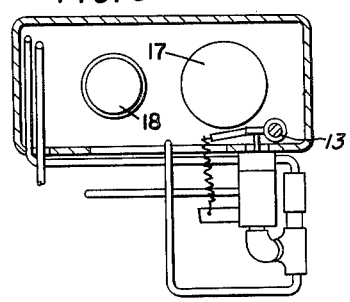
FIG. 8 is a view taken on line 8—8 of FIG. 6.
Figure 6:
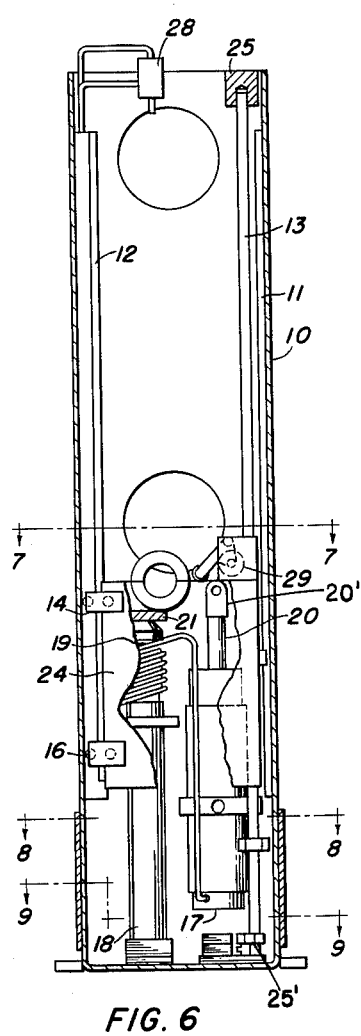
FIG. 6 is a cross sectional view taken on line 6—6 of FIG. 11.

The carriage 14 which supports the table on the base and moves up and down with it is made up of front and rear plates 24 (FIGS. 6 and 7). The plates 24 are connected at their sides by rigid members and have guides 15 fixed to one side thereof and rollers 16 fixed to the other side. Four of the rollers have axes which are perpendicular to the longitudinal length of the table and two of them are parallel thereto. Two of the rollers are on opposite sides of the bar of a T-shaped track 12 while the other rollers run alongside of the bar of the T-shaped track. Thus, the table is guided precisely in up and down movement.

The carriage 14 is moved up and down by a cylinder lift 18 (FIG. 6) which has a piston rod 19 which engages a bracket member 21 on the carriage to force the table up. It will be noted that the carriage has the vertically spaced rollers 16 thereon.

A shaft 13 is hinged to the frame at its upper end by a block 25 and at its lower end at 25' and the roller 26 rolls on a track 27 attached thereto. A valve 28 is fixed to the top of the frame 10 and is part of the hydraulic safety circuit designed to prevent the foot end of the table from striking the floor.

A Trendelenburg cylinder 17 is fixed to the carriage 14 and it has a piston therein which moves upwardly and downwardly. The piston has a piston rod 20 attached to the Trendelenburg arm at its free end. This swings the table on the journal 23 in Trendelenburg relation.

The vertical movement of the table as well as the Trendelenburg movement is controlled by pedals 30 and 31 (FIG. 1) which are connected in a parallel arrangement with pedals 32 and 33. Thus, the hospital staff can control the table regardless at which side of the table they may happen to be standing.

Table

The table is supported on the rigid frame built onto transverse members 35 and 36 (FIGS. 12 to 15). The transverse members 35 and 36 are integral with upwardly diverging members 37 and 38. The upwardly diverging members 37 and 38 are fixed to a hub 34. The hub 34 is received in the journal 23 with a Trendelenburg arm 39 movable in the table journal cut-out. The structural frame members 34, 35, 36, 37, and 38 are all heavy and cylindrical in shape and made of strong rigid material which aids in rigidly holding the table in shape. The piston rod 20 of the Trendelenburg cylinder 17 (FIG. 6) is connected to the arm 39 (FIG. 12) by means of a suitable pin through a clevis 20'.

Table (FIGS. 12, 13, 14 and 15)

Table structure 40 is built up of a rigid frame having a rigid top section 41 and a rigid bottom section 42. Each of these sections is made from longitudinally extending angle iron members, for example, with a laterally extending angle iron 43 holding the upper section 41 together at one end and a laterally extending plate at the other end holding the bottom section 42 to the top section.

The bottom frame section 42 is likewise of longitudinally extending angle iron members, all fixed to the top frame section and fixed to the transverse members 35 and 36.

A shaft 45 is fixed at its ends to a plate 44 and to the transverse angle iron at its other end. The shaft 45 receives bearings 46 and 47 which are fixed to the transverse frame members of a bucky carriage 48. An end 51 of a screw 49 is rotatably received in a bearing 52. A crank 53 (FIG. 1) is attached to the outer end of the screw at the end 51. The screw 49 can be rotated by means of the crank 53 and the bucky and X-ray tube can be moved along the table and adjusted thereon.

A sleeve 56' receives a column 56 (FIG. 1). A sleeve 59 (FIG. 2) is fixed to an upper column 59' which is, in turn, fixed to an arm 57'. A handle 58' actuates a suitable locking arrangement whereby the X-ray tube attached to a carriage 57 may be locked in position over the table or swung laterally out of the way. Provision has been made for lateral movement of the X-ray tube on the carriage 57 for stereoscopic films. The bucky may be leveled by means of a cam 61 (FIG. 12).

Leg rest

The knee crutch assemblies (FIG. 1) are fixed to the table frame. Sockets 163 receive L-shaped arms 64 which have knee receiving crutches 65 thereon. The knee receiving crutches 65 are pivotally supported at 68. Rotation on the vertical axis may be locked in a selected position by a friction lock handle 67. A handle 66 frictionally locks the bracket which supports the crutches 65 on the horizontal parts of the L-shaped arms 64.

Figure 12:
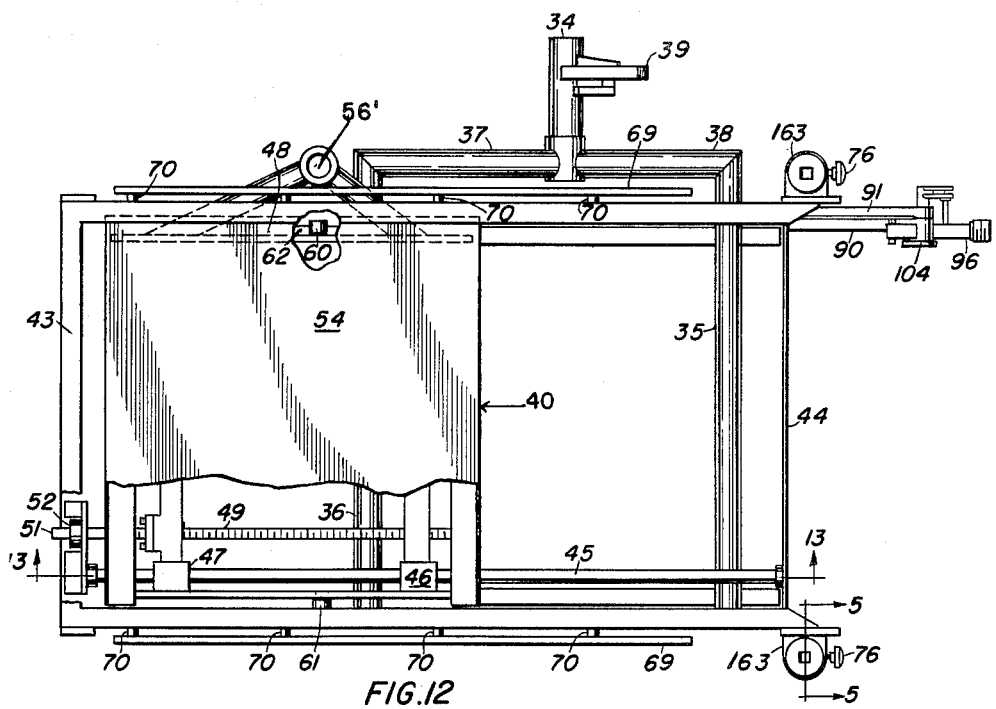
FIG. 12 is a top view of the table showing some parts broken away.
Figure 13:
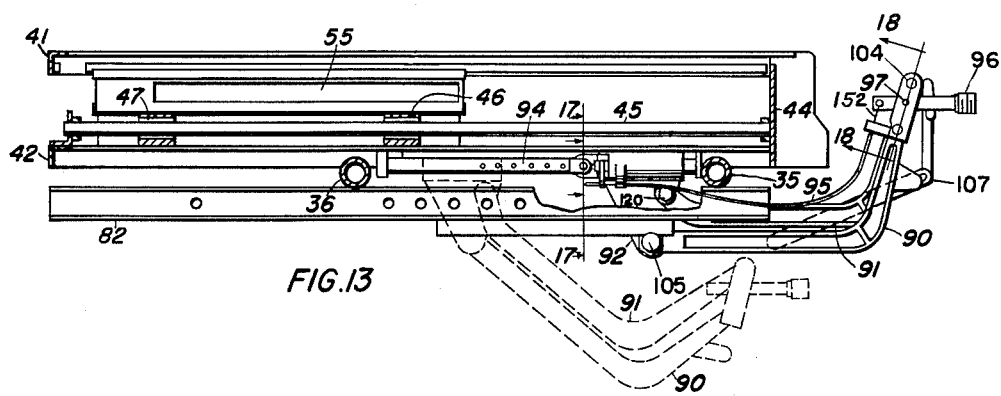
FIG. 13 is a side view of the table.
Figure 14:
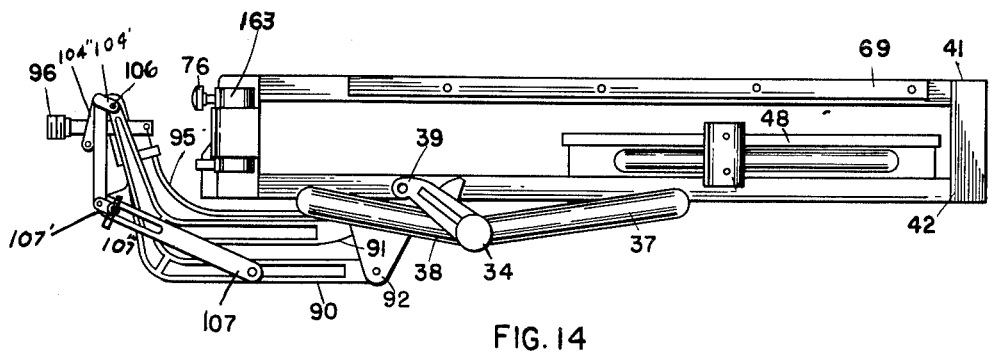
FIG. 14 is a partial side view of a part of the table.
Figure 15:
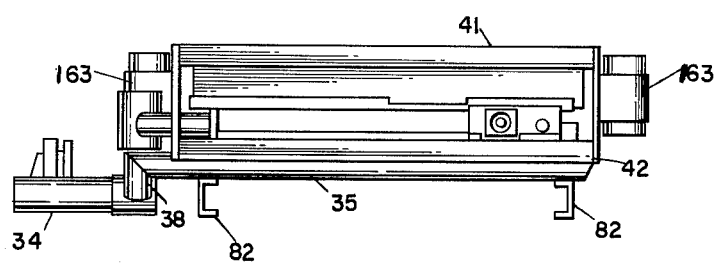
FIG. 15 is a partial end view of the table.

Side rails 69 are rectangular in cross section and are held in fixed spaced relation to the table by means of spacers 70 (FIG. 12). These rails may be used to support shoulder rests 71 which are supported on brackets 72 and locked to the guides by means of locking clamps 73. The locking clamps will be of a suitable design familiar to those skilled in the art.

The sockets 163 which support the leg holders are shown in detail in FIGS. 4 and 5 and constitute an important part of this invention. A sleeve 63 is fixed to the table frame. The L-shaped arm 64 is non-rotatably received at its lower end in a hollow member 172 and rotates with it. The flange of the hollow member 172 rests on the upper end of the sleeve 63 and a stop disk 173. A collar 174 rotates inside of the sleeve 63 and receives the lower end of a spring 177. The lower side of the stop disk 173 rests in a counterbore in the sleeve 63. The hollow member 172 is held on the release collar 174 by a snap ring 175.

The spring 177 surrounds the hollow member 172 and the upper end of the spring is received in a hole in the stop disk 173 while the lower end of the spring is received in the release collar 174. The spring 177 is of slightly lesser undeflected internal diameter than the outside diameter of the hollow member 172. Therefore, when the leg supports are swung outwardly, the spring 177 tends to unwind and to allow the legs to spread. The legs canot be swung in, however, until the spring is released since it binds on the rotating hollow member 172 in this direction. Thus, when the surgeon wishes to move the legs of the patient outwardly, he merely needs to engage the crutch member with his shoulder, this will rotate the rotating member 172 in a direction which will cause the spring 177 to unwind. The frictional force of the spring 177 causes rotation of the collar 174, unwinding the spring and allowing the crutch to be rotated outwardly. If the patient tries to force the leg inwardly, it will cause the rotating member 172 to frictionally engage the spring, causing it to lock rotation.

Foot section

The foot section is made of two parallel arms 80 which are slidably supported on the table and have a leg rest 81 thereon. The arms 80 are supported on the table by means of parallel motion links 83. The arms 80 are supported in the tracks formed by channels 82 (FIG. 15) which are disposed with their open sides toward each other and receive outwardly extending rollers which are fixed to each side of the arms 80. The channels 82 are fixed to the transverse members 35 and 36 by welding or the like.

The leg rest 81 (FIGS. 1 and 3) is supported on the parallel links 83 which are pivoted at one end to the leg rest 81 and at the other end to the arms 80. Thus, the leg rest 81 moves parallel to the arms 80. A telescoping member 85 is pivotally connected to the leg rest 81 and to the arms 80 to prevent the leg rest from falling down inadvertently from its raised position. A safety lock lever 22 (FIG. 1) is also provided to prevent the leg rest 81 from falling when the table is in the Trendelenburg position.

A lock is provided with a handle 86 connected to a rod 87. The rod 87 is slidably supported in a bracket 88 (FIG. 1) on the arms 80 and is fixed at its other end to a locking mechanism for locking the arms 80 in predetermined selective positions.

*Drainage tray*

Figure 16:
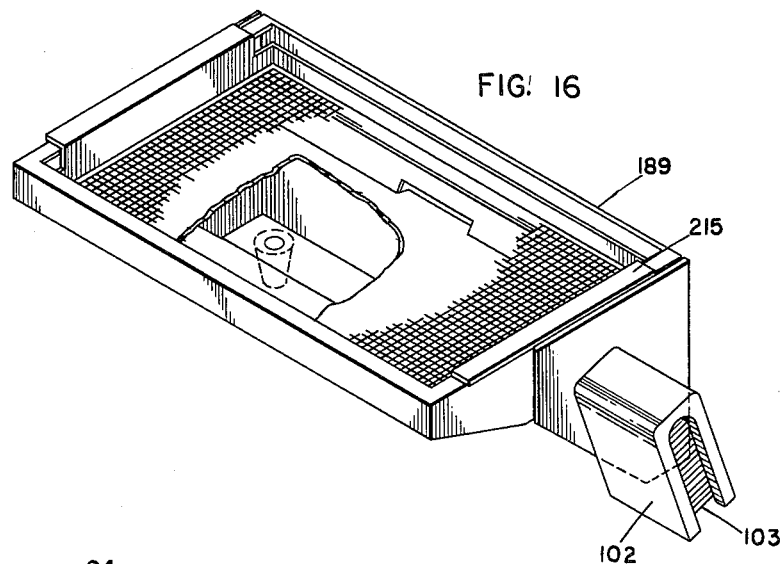
FIG. 16 is an isometric view of the drain tray.

A drainage tray 189 (FIGS. 1, 13, and 16) is supported on arms 90 and 91 which are supported at the side of the table adjacent the fixed frame. The arms 90 and 91 are both swingably supported in a carriage 92. The carriage 92 is slidably supported on a shaft track 94. The shaft track 94 is fixed at each end to the frame section 42 of the table. The carriage 92 (FIGS. 17 and 19) has a locking mechanism therein. This locking mechanism is locked and unlocked by a Bowden wire 95 connected at its inner end to the actuating mechanism of the locking mechanism on the carriage 92 and operated at its outer end by a handle 96 which is itself pivotally connected to the arm 90 at 97.

When the handle 96 is actuated, it unlatches a pin 96' from holes 94'. A spring 94" normally urges the pin 96' into the holes 94'. The handle 96 is threaded to receive a sterilizable handle. Thus, the surgeon need not interrupt his sterile technique in touching the handle.

The distal ends of the arms 90 and 91 have the tray 189 supported thereon. The tray has a bracket 102 at one side thereof fixed thereto. This bracket has a T-shaped slot 103 which removably receives an end 104 on the arm 90. The end 104 is complementary in shape to the T-shaped slot 103. Thus, the tray, when in position on the end 104, is, in effect, a fixed part of the arm 90 and it swings around a pivotal connection 105 of the arm 90. The arm 91 is pivoted at 120 to the carriage and to the end 104 of the arm 90 at 106, 107, and other links not mentioned.

Figure 18:
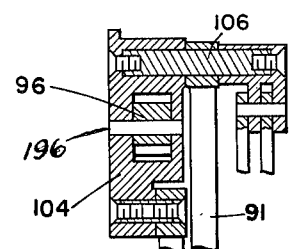
FIG. 18 is a cross sectional view taken on line 18—18 of FIG. 13.

The link 107 (FIG. 14) is pivoted to the arm 90 at one end and to a bracket 107' at its other end by a screw handle 107". A link 104' is pivoted to the arm 90 at 104. The link 104' has a branch 104" which is attached to the handle 96. Thus, when the handle 96 is forced down, it pivots about a pin 196 (FIG. 18) and puts a tension on a wire 152 (FIG. 19), thereby releasing the pin 96' from the holes 94' so that the carriage 92 can slide on the track 94. When the screw handle 107" is loosened, the link 107 will allow the arms 90 and 91 to swing down to the position shown in dotted lines in FIG. 13; that is, to a position under the table.

The bracket and tray 189 can be removed for complete sterilization. A tray 215 can be removed for sterilization. A handle received on the threaded end of the handle 96 can be removed for sterilization.

Figure 17:
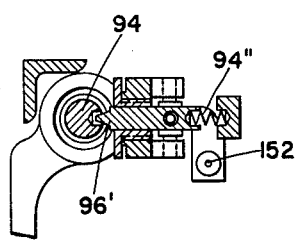
FIG. 17 is a cross sectional view taken on line 17—17 of FIG. 19.
Figure 19:
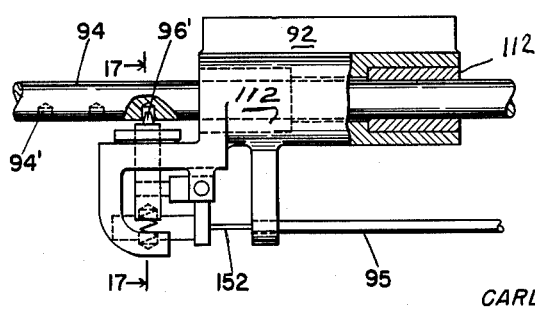
FIG. 19 is an enlarged side view partly in cross section of the locking mechanism for the tray.

The carriage 92 slidably receives the shaft track 94. The Bowden wire 152 locks the carriage 92 on the track 94 as shown in FIGS. 17 and 19.

The entire table is adjusted by means of the handle 96 which adjusts the tray, the handle 86 which adjusts the leg rest, and wheel screws 76 which adjust the height of the crutches, as well as the pedals 30, 31, 32, and 33 which are accessible by the X-ray technician for adjusting the bucky to the desired position.

A pointer 115 is swingably supported on the table at 116 along a calibrated scale 117. Thus, gravity holds the pointer 115 in a vertical position and the position of the table can be read from the scale 117.

The hydraulic circuit shown in FIG. 20 includes an emergency pump 137 and a motor driven pump 139 which supplies oil from a sump 138 and directs it under pressure to the appropriate parts of the control circuit. The valve mechanism shown includes a safety valve 150, the foot control valves, the bypass valve 28, a two position valve 239, and a double pilot check valve 144.

A "safe" valve 150' is actuated by a lever 235 which is attached to the shaft or control rod 13 (FIGS. 6 and 20) and is rotated as the table rotates. The rod 13 actuates the valve 150' when the table reaches a position twenty-five degrees from the horizontal in reverse Trendelenburg position. The valves 150' and 239 are shown in the position they would occupy when the table is in a horizontal position. The bypass valve 28 is in the form of a whistle or poppet type valve located at the top of the table column.

The valve 144 is a double pilot check valve which controls the flow of fluid to and from the Trendelenburg cylinder 17.

When a valve 54 is in Trendelenburg position, fluid will flow from the pump 139. This will force a ball 243 open and allow fluid to enter a line 146. It will also force a valve member 242 against a ball 244 to open it so that oil can flow from above the piston in the cylinder 17 into a line 147 and through the valve 144 to a line 148.

To raise the table with the table in horizontal position, the operator will actuate the up-down foot pedal 31. This will allow fluid to flow from the pump 139 through a filter F and a pipe 132 through a line 131, through the "safe" valve 150', up through a line 130, to the cylinder lift 18. Fluid under pressure in the cylinder lift will force the piston therein to raise the table by moving the piston in the cylinder lift upwardly. The cylinder lift 18 is shown in FIGS. 6 and 20, for example. The table will move upwardly until either the foot control is deactuated or the carriage reaches its maximum height.

To lower the table, an up-down valve 43' will be pushed to the down position. This will allow fluid to flow from below the piston in the cylinder lift 18 back through the line 130, valve 150', valve 43', and a line 135 to the sump 138.

To move the table in Trendelenburg, the valve 43' will remain deactuated and the Trendelenburg valve 54 will be moved to the Trendelenburg position. This will allow liquid to flow from the pump 139 through the filter F, through the valve 54, through a pipe 140, through a restricting check valve 136, through a line 145, through the double pilot check valve 144, and through the line 146 to the space below the Trendelenburg piston in the cylinder 17. This will force the piston in the cylinder 17 to rise, raising a piston rod 120 and acting through an arm 139A to swing the table on the hub 34. Oil from above the piston in the cylinder 17 will flow through the line 147, the valve 144, the line 148, a check valve 142, a restricting check valve 136', the valve 54, and the line 135 back to the sump.

To operate the table in reverse Trendelenburg, the Trendelenburg pedal 30 is moved to the reverse Trendelenburg position. This will allow oil to flow from the pump 139 through the filter F, valve 54, restricting valve 136', line 141, valve 239, and line 148 and through the double pilot check valve 144 to the space above the Trendelenburg cylinder. This will cause it to swing the table in reverse Trendelenburg. The ball 243 will be held open by a piston 134. The oil below the piston in the Trendelenburg cylinder 17 will be forced out past the ball 243 through the line 145, restricting valve 136', valve 54, line 135, and into the sump 138.

To move the table in reverse Trendelenburg after it has rotated in reverse Trendelenburg through twenty-five degrees of rotation, the cam roller 29 rotates the shaft or control rod 13 and shifts the valve 239 to connect the line 141 to line 133. This will allow fluid to flow from the pump 139 through the valve 54, restricting valve 136', line 141, valve 239, line 133, check valve 151, and line 130 to the space below the piston in cylinder lift 18 to raise the table so that the lowered end of the table will not strike the floor. The table can continue to rise until it strikes the bypass valve 28. This will allow the oil which had been directed to the line 133 to bypass back to the line 148.

To continue movement of the table in reverse Trendelenburg after twenty-five degrees rotation and after it has reached its full elevation position, the reverse Trendelenburg foot pedal 30 will be held in reverse Trendelenburg position. The valve 28 will be held open. Thus, fluid can flow from the line 141 to the line 133 to the cylinder lift 18 and, also, through the line 148 and valve 144 to the top of the cylinder 17.

The valve 144 has the two spring loaded check valve balls 243 and 244 which are both opened by fluid pressure from lines 145 and 148, respectively, and by the piston 134 and the check valve piston 242, respectively. The piston 134 is urged against the check valve ball 243 by fluid bleeding through a tube 241 when fluid is impressed in the line 148. The piston 242 urges the check valve ball 244 open when fluid under pressure is impressed in the line 145. If pressure is inserted in neither of the lines 145 or 148, the check valve balls 243 and 244 will seat and the Trendelenburg piston will be held in fixed position.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A table comprising
a support frame,
a patient supporting surface on said table,
arms extending generally parallel to said table and having a movable leg supporting member thereon,
a tray relative to the table top and accessible,
a carriage comprising laterally spaced, longitudinally extending links having means on one end supported on said table for moving said tray parallel to the movement of said leg supporting member,
means to adjust said arms on said table to adjust the vertical and axial position of said tray from the perineal end of said table,
and means to adjust said leg supporting member being accessible from the perineal end of said table.

2. The table recited in claim 1 wherein
knee crutches are supported on each side of said table,
means for adjusting each of said knee crutches, tray, and leg rest relative to said supporting surface,
means for adjusting said table in vertical position and Trendelenburg position,
and control means for each said adjustment accessible from the perineal end of said table.

3. The table recited in claim 2 wherein
said leg rest is supported on a four bar linkage and said four bar linkage is supported on a carriage,
said carriage being supported on a track disposed longitudinally of said table.

4. The table recited in claim 1 wherein
said links are supported in position by means of a quick locking mechanism,
said locking mechanism having a removable bracket supporting said tray whereby said tray can be removed for cleaning and sterilizing.

5. The table recited in claim 1 wherein
said means supporting said links on said table comprise a track attached to said table at one side thereof,
means to lock said links selectively in any of a plurality of fixed angular positions relative to said table for supporting said tray,
and means for locking said carriage in position on said track.

6. The table recited in claim 5 wherein
said means to lock said links and said means to lock said carriage comprises a single handle.

7. A surgical table comprising
a base,
a vertically disposed support fixed to one side of said base and extending upwardly therefrom,
a table top supported on said vertically disposed support and extending over said base,
a leg rest on one end of said table,
means to move said table up and down to predetermined positions,
means to swing said table in Trendelenburg motion,
and control means connected to said Trendelenburg means and to said means to move said table up and down for moving said table vertically to any selected angular position less than a predetermined angular position and to move said table vertically to a predetermined vertical position.

8. A surgical table comprising
a base,
a vertical support attached to one side of said base,
a journal on said vertical support,
a table top,
hub means attached to said table top and rotatably receiving said journal,
means to move said table up and down,
a Trendelenburg cylinder in said vertical support connected to said table for swinging said table on said journal,
and control means connected to said Trendelenburg cylinder and to said means to move said table up and down for moving said table vertically to any selected angular position less than a predetermined angular position and to move said table vertically to a predetermined vertical position when said table swings to said angular position on said journal, thereby preventing said table from swinging beyond said predetermined angular position until said table has been moved upwardly.

9. A surgical table comprising, in combination, a table and a pedestal,
said table being supported on said pedestal by means of a rotatable member attached to said table and extending laterally from said pedestal,
hydraulic means for raising and lowering said table and for supporting said table in a horizontal position,
means for tilting said table longitudinally when it is in a horizontal position,
said table having a cam member thereon engaging a valve,
said valve directing hydraulic fluid to said hydraulic means for lifting said table when said table is tilted a predetermined amount,
actuating means supporting said table on said pedestal,
and a valve actuated by said actuating means when said table swings to a predetermined position.

10. The table recited in claim 9 wherein
said means for tilting said table comprises a double acting hydraulic cylinder to tilt said table in Trendelenburg and in reverse Trendelenburg,
said valve means comprising a double pilot check valve checking the flow of fluid from all parts of said cylinder when no hydraulic fluid pressure is applied to said valve.

11. The table recited in claim 9 wherein
said means for raising and lowering said table comprises a lifting cylinder and a Trendelenburg cylinder,
pump means for supplying fluid under pressure to said cylinders,
an up-down valve and a Trendelenburg valve connected in series with said pump means,
said up-down valve selectively connecting said lifting cylinder to said pump means and to a return line to a pump,
said Trendelenburg valve having means selectively connecting said pump means to one side of said Trendelenburg cylinder to swing said table in Trendelenburg and in reverse Trendelenburg,
a valve actuated by means on said table when said table has tilted through a predetermined angle, diverting fluid from said pump means through said Trendelenburg valve to said lifting cylinder,
and a bypass valve means engaged by a carriage on said table connecting said lifting cylinder and one part of said Trendelenburg cylinder in parallel when said table is tilted a predetermined amount whereby said table is tilted further by fluid directed to said Trendelenburg cylinder through said bypass valve means.

12. The table recited in claim 11 wherein
a safe valve is provided between said up-down valve and said lifting cylinder,
said safe valve having means thereon actuated by said table when it swings to a predetermined position for stopping the swinging of said table at said predetermined position, causing said table to elevate.

13. A surgical table comprising
a patient supporting top,
knee crutch members,
means attaching said knee crutch members one to each side of said table,
said knee crutch members each comprising an L-shaped member having a vertical part and a horizontal part,
said horizontal part extending toward the perineal end of said table and having a knee receiving member thereon,
a socket fixed to said table at each side thereof,
a hollow member disposed in said socket concentric thereto and rotatable therein,
a helical spring in said socket having a first end fixed to said socket and wound around said hollow member,
and a stop disk on said hollow member resting on said socket,
a second end of said spring being fixed to said disk and a part of said hollow member resting on said disk,
the undeflected inside diameter of said spring being less than the outside diameter of said hollow member,
said helical spring extending from said first end around said hollow member in a direction to bind on said hollow member when the L-shaped member attached thereto is swung toward the center of said table,
said spring being wound so as to slide on said hollow member when said L-shaped member attached thereto is swung away from the center of said table.

14. A table comprising
a support frame,
a patient supporting surface on said table,
arms extending generally parallel to said table and having a leg supporting member thereon,
a tray,
a carriage on said table for moving said tray parallel to the movement of said leg supporting member,
means to adjust the vertical and axial position of said tray from the perineal end of said table,
means to adjust said leg supporting member being accessible from the perineal end of said table,
crutch supporting brackets supported on said table at the perineal end thereof,
and L-shaped arms in said crutch supporting brackets,
said L-shaped arms extending upwardly from said brackets, then generally parallel to said patient supporting surface and having knee crutch members thereon,
said crutch supporting brackets comprising means allowing said L-shaped arms to swing outwardly but restraining said arms from swinging inwardly,
said members being at a height of the shoulders of a surgeon, during procedures, above a floor supporting said table whereby the surgeon can engage said crutch members with his shoulders and move them outwardly, thereby avoiding breaking his sterile technique.

References Cited by the Examiner

UNITED STATES PATENTS

| | | | |
|---|---|---|---|
| 2,306,031 | 12/1942 | Anderson et al. | 269—323 |
| 2,567,566 | 9/1951 | Kizaur | 250—62 |
| 2,569,561 | 10/1951 | Friedman | 250—58 |
| 2,668,913 | 2/1954 | Goldfield et al. | 250—62 |
| 2,828,172 | 3/1958 | McDonald | 269—323 |
| 2,895,775 | 7/1959 | McDonald et al. | 269—325 |
| 2,945,731 | 7/1960 | Tutrone | 269—327 |
| 3,043,953 | 7/1962 | Craig et al. | 250—57 |
| 3,046,072 | 7/1962 | Douglass et al. | 269—328 |

RALPH G. NILSON, *Primary Examiner.*

H. S. MILLER, G. E. MATTHEWS, A. L. BIRCH,
*Assistant Examiners.*